Jan. 24, 1939. E. A. RYDER 2,144,937
GEARING
Filed Dec. 8, 1937 2 Sheets-Sheet 1

INVENTOR.
Earle A. Ryder
BY Harris G. Luther
ATTORNEY

Jan. 24, 1939.   E. A. RYDER   2,144,937
GEARING
Filed Dec. 8, 1937   2 Sheets-Sheet 2

INVENTOR.
Earle A. Ryder
BY Harris G. Luther
ATTORNEY

Patented Jan. 24, 1939

2,144,937

UNITED STATES PATENT OFFICE 2,144,937

GEARING

Earle A. Ryder, West Hartford, Conn., assignor to United Aircraft Corporation, East Hartford, Conn., a corporation of Delaware Application December 8, 1937, Serial No. 178,768

7 Claims. (Cl. 74—305)

This invention relates to improvements in gearing and has for an object the provision of improved means for maintaining the gear elements of a gear train in alignment with each other.

Other objects and advantages will be more particularly pointed out hereinafter or will become apparent as the description proceeds.

In the accompanying drawings, in which like reference numerals are used to designate similar parts throughout, there is illustrated a suitable mechanical embodiment of what is now considered to be the preferred form of the invention. The drawings, however, are for the purpose of illustration only and are not to be taken as in any way limiting or restricting the scope of the invention.

In the drawings, Fig. 1 is a vertical sectional view of a planetary gear train showing the application thereto of gear aligning means constructed according to this invention.

Figure 1:
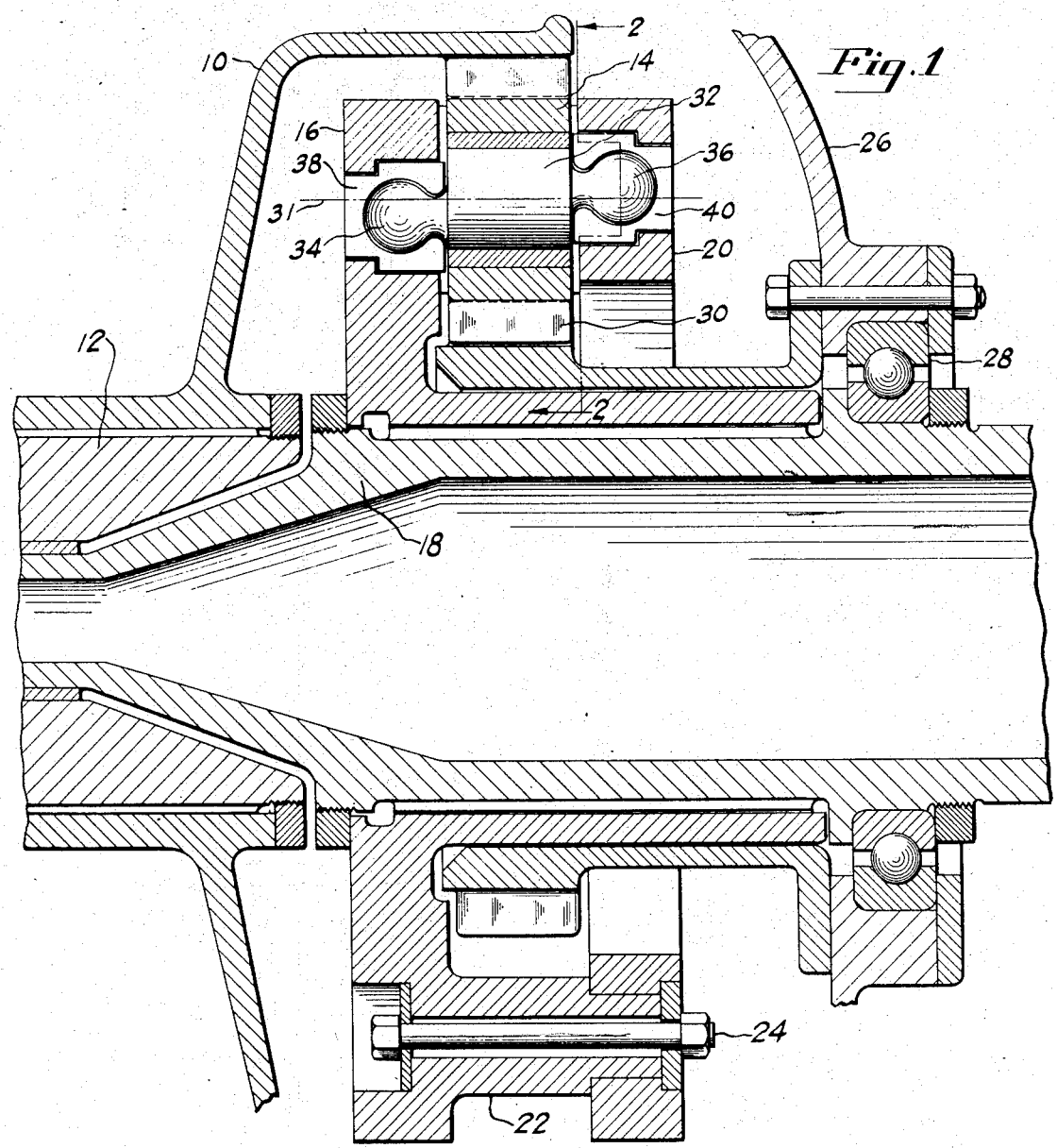

Referring to the drawings in detail, there is illustrated in Fig. 1, by way of example, a suitable planetary gear train in which the device of the invention may be advantageously incorporated. In the gear train illustrated a drive gear 10 is secured on a drive shaft 12 and meshes with and drives one or more pinion gears 14. The pinions 14 are carried in a two-part cage having one part 16 splined on a driven shaft 18 and the other part 20 supported on the part 16 by suitable means such as the integral extensions 22, and through bolts 24. The entire gear train may be supported in a casing 26 by suitable means such as the anti-friction bearing 28. A sun gear 30 is rigidly secured to the casing 26 and meshes with the pinion gears 14 on the side thereof opposite the drive gear 10. As the drive gear 10 is turned by the shaft 12, the pinions 14 roll around the sun gear 30 carrying with them the two-part cage 16—20 which in turn drives the driven shaft 18 at a rotational speed less than the rotational speed of a drive shaft 12. The flow of power may be reversed if desired so that the transmission will be speed increasing instead of speed reducing.

Because of the flexibility of the cage there is a tendency for the pinion axles 32 to be deflected slightly out of perpendicular to the plane of rotation of the pinions, which displacement of the pinion axles causes a slight misalignment of the teeth of the pinion gears with the teeth of a drive gear 10 and the sun gear 30 and also causes more of the load transmitted by the gear teeth to be exerted at one end of each tooth than at the other, thereby causing uneven wear of the respective gear teeth.

It has been found possible to correct this misalignment of the gear teeth and unequal distribution of tooth loads by making the supporting ends of each pinion axle slightly eccentric in opposite directions with respect to the axis of the axle.

In the form of the invention illustrated, the axle 32 is supported by the integral knobs or balls 34 and 36 received in split bearing elements 38 and 40 mounted in suitable holes in the cage members 16 and 20 respectively. The balls 34 and 36 have their centers located a short distance away from and on opposite sides of the axis 31 of the axle 32. The load of the gear on its axle is balanced by the reactions of the balls in their sockets, the combined force of said reactions being equal in amount and opposite in direction to the gear load. In a symmetrical design, each ball reaction will be equal to one-half the gear load when the latter is evenly distributed from end to end of the axle. Due to its eccentricity from the axis of the axle 32, each ball reaction exerts a torque about its axis, and in the symmetrical condition stated, the torques of the two ball reactions are equal and opposite so that equilibrium exists. Whenever the gear is loaded more heavily at one end than at the other, the reaction of the corresponding ball, and its torque about axis 31 will preponderate. This causes the axle 32 to rotate until the resulting change in direction of the gear axis restores the symmetry of the gear load, again making the ball reactions equal and putting the system in equilibrium.

In the example illustrated, only one cause of uneven gear loading will be considered, this being the elastic deflection of cage 20 by the forces imposed upon it.

Because of the effect of friction between the gear and the axle tending to rotate the axle it may be desirable to have one of the supporting knobs or balls offset from the axis of the axle a greater distance than the other so that the reactive force on the ball, acting through this longer lever arm, will counteract the tendency of the axle to rotate because of the friction between it and the gear.

Figure 2:
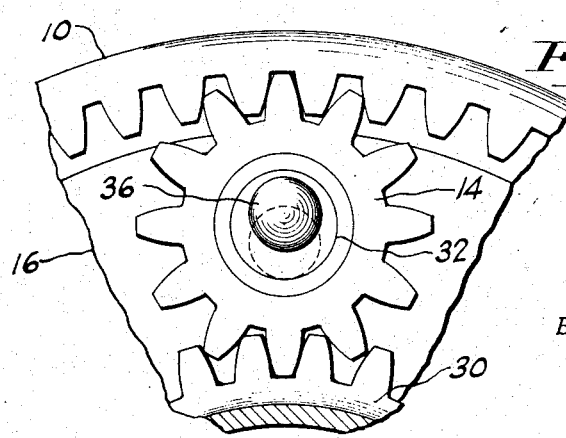
Fig. 2 is an end elevation of a fragmentary portion of the gear train illustrated in Fig. 1.
Figure 4:
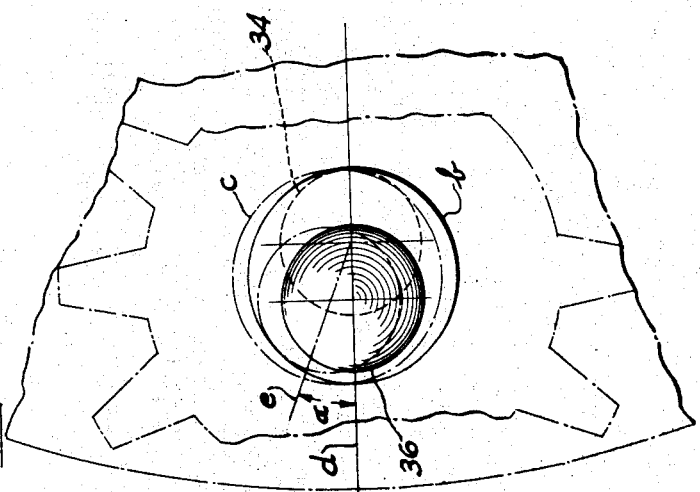
Fig. 4 is an end view of the pinion gear axle showing an operative position different from that illustrated in Fig. 2.
Figure 3:
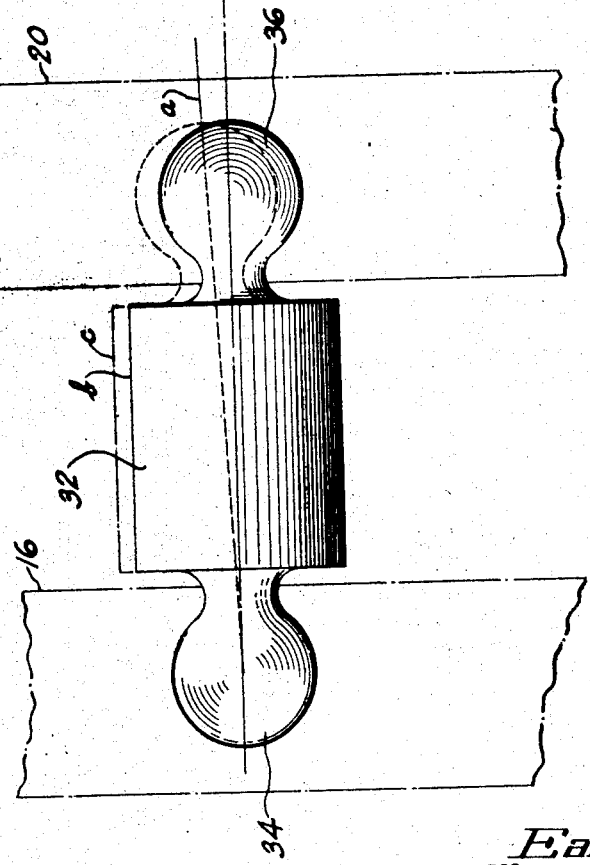
Fig. 3 is a top plan view on an enlarged scale of one of the pinion gear axles.

The manner in which the position of the axle is corrected is schematically indicated in Figs. 3 and 4. The center of the spherical support 36 is positioned radially outward from the axis of the axle 32 while the center of the spherical support 34 is positioned radially inward from the axis of the axle, as is clearly indicated in Figs. 1 and 2. The position which the axis of the axle tends to assume when the cage member 20 moves with respect to the cage member 16, due to the flexibility of the cage, is exaggeratedly indicated by the dotted line $a$ in Fig. 3, and shows that the axle would be definitely oblique with respect to the cage members. With the construction illustrated, the forces tending to deflect the axis of the axle to the angular position indicated rotate the axle a slight amount so that, owing to the eccentricity of the supports 34 and 36, the opposite ends of the axle are moved in opposite directions tangentially to the rotation of the cage. This movement causes the axle to assume a new position as indicated by the full line outline $b$ in Fig. 4 bodily removed from its original position indicated by the chain line outline $c$ but still substantially parallel to the axis of rotation of the gears or in alignment with the teeth of the drive gear and reaction gear.

Considering that the plane passing through the centers of the spherical supports 34 and 36, and the axis of the axle 32, when the axle is in its normal or unloaded position, is indicated by the line $d$ in Fig. 4, when the axle has been rotated to correct the deflection due to load, the same centers will lie in a plane the edge of which is indicated at $e$ in Fig. 4 disposed at an angle alpha to the line $d$. The angle alpha is the angular rotation of the axle 32 about an axis substantially parallel to the axis of the axle and passing through the center of the sphere 34 which, for the purpose of this explanation, has been considered as relatively stationary. Because the pinion gear is in a balanced condition when the tooth load is equally distributed along the length of each meshing tooth, an unequal distribution of the load along the length of a tooth will produce a reactive twist on the gear which will automatically rotate the axle about its eccentric supports, and a condition obtained which tends to maintain the pinion gear in its balanced condition in which its teeth are parallel to the teeth of the driving gear and in which the load is equally distributed along the length of the meshing gear teeth.

While there has been illustrated and described a suitable mechanical embodiment of what is now considered to be the preferred form of the invention, it is to be understood that the invention is in no way limited to the particular form so illustrated and described by way of example, but that such changes in the size, shape and arrangement of parts may be resorted to as come within the scope of the subjoined claims.

Having now described the invention so that others skilled in the art may clearly understand the same what it is desired to secure by Letters Patent is as follows:

1. Gear aligning means comprising a gear axle having supporting end portions with centers spaced from the axis of said axle and located on opposite sides thereof, and means supporting said axle at each end thereof.

2. Gear aligning and tooth load equalizing means comprising a gear axle having substantially spherical supporting portions at its opposite ends with their centers spaced from the axis of said axle on diametrically opposite sides thereof, and means receiving said end portions to support said axle.

3. In a gear train including a drive gear, a driven gear, a pinion gear, an axle for said pinion gear, and a cage supporting said axle at each end, means for maintaining the meshing teeth of said gears in alignment under load comprising an eccentrically disposed supporting portion at each end of said axle, and means supporting said portion in said cage for relative rotation with respect thereto.

4. In a gear train including a drive gear, a driven gear, a pinion gear, an axle for said pinion gear, and a cage supporting said axle at each end, means for maintaining the meshing teeth of said gears in alignment under load comprising an eccentrically disposed supporting portion at each end of said axle, and means supporting said portions in said cage for relative rotation with respect thereto, the centers of said supporting portions being spaced from and disposed on opposite sides of the axis of said axle.

5. In a gear train including a drive gear, a driven gear, a pinion gear, an axle for said pinion gear, and means carrying said axle, means for maintaining the meshing teeth of said gears in alignment under load comprising an eccentrically disposed supporting portion at each end of said axle and means supporting said portions in said axle carrying means for relative rotation with respect thereto, the parallel axes of said supporting portions and said axle intersecting a single radial line of said axle carrying means when said gear train is not under load.

6. In a gear train a pinion having an axle supported at spaced points, one of which points is subject to movement relative to the other under the action of load applied to the pinion, bearings at said spaced points eccentrically disposed with respect to said gear axle and constructed and arranged to move the gear axle under the action of said load so as to substantially neutralize the effect of said relative movement on the position of the axle of the gear.

7. In combination a gear support having spaced portions subject to relative movement under the action of load applied to said gear, a gear axle mounted in said spaced portions and subject to movement with said support, bearings eccentrically located with respect to said axle, connecting said axle and said support, said bearings disposed on opposite sides of the axis of said axle so that the load which causes said relative movement will cause rotation of said axle about said eccentric bearings to maintain the gear axle substantially parallel to its original position.

EARLE A. RYDER.